United States Patent
Hjelmgaard et al.

(10) Patent No.: US 11,242,629 B2
(45) Date of Patent: Feb. 8, 2022

(54) BIOBINDER

(71) Applicant: ROCKWOOL INTERNATIONAL A/S, Hedehusene (DK)

(72) Inventors: Thomas Hjelmgaard, Fredensborg (DK); Povl Nissen, Olstykke (DK); Erling Lennart Hansen, Virum (DK); Lars Naerum, Hellerup (DK)

(73) Assignee: ROCKWOOL INTERNATIONAL A/S, Hovedgaden (DK)

( * ) Notice: Subject to any disclaimer, the term of this patent is extended or adjusted under 35 U.S.C. 154(b) by 43 days.

(21) Appl. No.: 15/502,836

(22) PCT Filed: Aug. 25, 2015

(86) PCT No.: PCT/EP2015/069390
§ 371 (c)(1),
(2) Date: Feb. 9, 2017

(87) PCT Pub. No.: WO2016/030343
PCT Pub. Date: Mar. 3, 2016

(65) Prior Publication Data
US 2017/0233910 A1    Aug. 17, 2017

(30) Foreign Application Priority Data
Aug. 25, 2014 (EP) .................. 14182162

(51) Int. Cl.
| | | |
|---|---|---|
| D04H 1/4209 | (2012.01) | |
| D04H 1/587 | (2012.01) | |
| D04H 1/64 | (2012.01) | |
| C03C 25/32 | (2018.01) | |
| C03C 25/321 | (2018.01) | |

(52) U.S. Cl.
CPC ........... *D04H 1/4209* (2013.01); *C03C 25/32* (2013.01); *C03C 25/321* (2013.01); *D04H 1/587* (2013.01); *D04H 1/64* (2013.01)

(58) Field of Classification Search
CPC ............................. C08K 2003/309; E04C 2/16
See application file for complete search history.

(56) References Cited

U.S. PATENT DOCUMENTS

| | | | | |
|---|---|---|---|---|
| 3,062,682 | A * | 11/1962 | Morgan | C08J 9/0085 118/411 |
| 4,784,779 | A * | 11/1988 | Dadgar | C09K 8/06 252/389.61 |
| 5,318,990 | A | 6/1994 | Strauss | |
| 5,661,213 | A | 8/1997 | Arkens et al. | |
| 6,706,853 | B1 | 3/2004 | Stanssens et al. | |
| 6,730,730 | B1 | 5/2004 | Hansen et al. | |
| 6,849,683 | B2 | 2/2005 | Husemoen et al. | |
| 7,067,579 | B2 | 6/2006 | Taylor et al. | |
| 7,766,975 | B2 | 8/2010 | Clamen et al. | |
| 8,591,642 | B2 | 11/2013 | Hansen | |
| 2002/0091185 | A1 | 7/2002 | Taylor et al. | |
| 2003/0153690 | A1 | 8/2003 | Husemoen et al. | |
| 2004/0024170 | A1 | 2/2004 | Husemoen et al. | |
| 2006/0111480 | A1 | 5/2006 | Hansen et al. | |
| 2007/0006639 | A1 | 1/2007 | Clamen et al. | |
| 2007/0027283 | A1 | 2/2007 | Swift et al. | |
| 2007/0173588 | A1 | 7/2007 | Espiard et al. | |
| 2009/0227706 | A1 | 9/2009 | Hansen et al. | |
| 2010/0012879 | A1 | 1/2010 | Nissen | |
| 2010/0222459 | A1 | 9/2010 | Kelly et al. | |
| 2011/0223364 | A1 * | 9/2011 | Hawkins | C03C 25/1095 428/34.5 |
| 2012/0037836 | A1 | 2/2012 | Hansen | |
| 2012/0070645 | A1 | 3/2012 | Jaffrennou et al. | |
| 2013/0046055 | A1 | 2/2013 | Michl et al. | |
| 2014/0135430 | A1 * | 5/2014 | Naerum | C08J 5/24 524/58 |
| 2015/0010949 | A1 | 1/2015 | Jackson et al. | |

FOREIGN PATENT DOCUMENTS

| | | | |
|---|---|---|---|
| EP | 583086 | A1 | 2/1994 |
| EP | 0990727 | A1 | 4/2000 |
| EP | 1382642 | A1 | 1/2004 |
| EP | 1741726 | A1 | 1/2007 |
| EP | 2223940 | A1 | 9/2010 |
| EP | 2230222 | A1 | 9/2010 |
| EP | 2433983 | A1 | 3/2012 |
| EP | 2549006 | A1 | 1/2013 |
| WO | 9936368 | A1 | 7/1999 |
| WO | 0105725 | A1 | 1/2001 |
| WO | 0196460 | A2 | 12/2001 |
| WO | 0206178 | A2 | 12/2001 |
| WO | 2004007615 | A1 | 1/2004 |
| WO | 2006061249 | A1 | 6/2006 |

(Continued)

*Primary Examiner* — Stefanie J Cohen
(74) *Attorney, Agent, or Firm* — Abel Schillinger, LLP

(57) ABSTRACT

The invention relates to an aqueous binder composition for mineral fibers comprising a component (i) in the form of one or more compounds selected from —compounds of the formula, and any salts thereof. In which R1 corresponds to H, alkyl, monohydroxyalkyl, dihydroxyalkyl, polyhydroxyalkyl, alkylene, alkoxy, amine; —compounds of the formula, and any salts thereof. In which R2 corresponds to H, alkyl, monohydroxyalkyl, dihydroxyalkyl, polyhydroxyalkyl, alkylene, alkoxy, amine; a component (ii) in the form of one or more compounds selected from the group of ammonia, amines or any salts thereof; a component (iii) in the form of one or more carbohydrates.

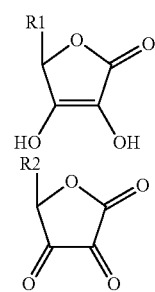

20 Claims, No Drawings

(56) References Cited

FOREIGN PATENT DOCUMENTS

| WO | 2008023032 | A1 | 2/2008 |
| WO | 2010139899 | A1 | 12/2010 |
| WO | 2013030390 | A1 | 3/2013 |

* cited by examiner

BIOBINDER

FIELD OF THE INVENTION

The present invention relates to an aqueous binder for mineral fibre products, a method of producing a bonded mineral fibre product using said binder, and a mineral fibre product comprising mineral fibres in contact with the cured binder.

BACKGROUND OF THE INVENTION

Mineral fibre products generally comprise man-made vitreous fibres (MMVF) such as, e.g., glass fibres, ceramic fibres, basalt fibres, slag wool, mineral wool and stone wool (rock wool), which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process. The fibres are blown into a forming chamber and, while airborne and while still hot, are sprayed with a binder solution and randomly deposited as a mat or web onto a travelling conveyor. The fibre mat is then transferred to a curing oven where heated air is blown through the mat to cure the binder and rigidly bond the mineral fibres together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A990727, EP-A-1741726, U.S. Pat. No. 5,318,990 and US-A-2007/0173588.

Another group of non-phenol-formaldehyde binders are the addition/elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Since some of the starting materials used in the production of these binders are rather expensive chemicals, there is an ongoing need to provide formaldehyde-free binders which are economically produced.

A further effect in connection with previously known aqueous binder compositions from mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are at least partly produced from renewable materials.

SUMMARY OF THE INVENTION

Accordingly, it was an object of the present invention to provide an aqueous binder composition which is particularly suitable for bonding mineral fibres, is economically produced and is using renewable materials as starting products for the preparation of the aqueous binder composition.

A further object of the present invention was to provide a mineral fibre product bonded with such a binder composition.

In accordance with a first aspect of the present invention, there is provided an aqueous binder composition for mineral fibres comprising:

a component (i) in the form of one or more compounds selected from
compounds of the formula, and any salts thereof:

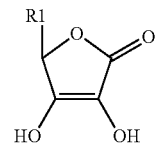

in which R1 corresponds to H, alkyl, monohydroxyalkyl, dihydroxyalkyl, polyhydroxyalkyl, alkylene, alkoxy, amine;
compounds of the formula, and any salts thereof:

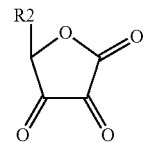

in which R2 corresponds to H, alkyl, monohydroxyalkyl, dihydroxyalkyl, polyhydroxyalkyl, alkylene, alkoxy, amine.
a component (ii) in the form of one or more compounds selected from ammonia, amines or any salts thereof;
a component (iii) in the form of one or more carbohydrates.

In accordance with a second aspect of the present invention, there is provided a method of producing a bonded mineral fibre product which comprises the steps of contacting the mineral fibres with the aqueous binder composition and curing the binder composition.

In accordance with a third aspect of the present invention, there is provided a mineral fibre product comprising mineral fibres in contact with the cured binder composition defined above.

The present inventors have surprisingly found that it is possible to prepare a binder composition for mineral fibres that uses to a large extent starting materials which are renewable and at the same time allow the economical production of the binder. Since a significant part of the starting materials used for the binder according to the present invention stems from biomass and at the same time the materials used are comparatively low in price, the binder according to the present invention is both economically and ecologically advantageous. The combination of these two aspects is particularly remarkable, since "biomaterials" are often more expensive than conventional materials.

At the same time, the binders according to the present invention show excellent properties when used for binding mineral fibres. The mechanical strength is improved and has also an unexpected high level when subjected to ageing conditions.

An additional advantage of the binders according to the present invention is that they have a comparatively high curing speed at a low curing temperature.

Further, the binders according to one embodiment of the present invention are not strongly acidic and therefore overcome corrosion problems associated with strongly acidic binders known from the prior art.

DESCRIPTION OF THE PREFERRED EMBODIMENTS

The aqueous binder composition according to the present invention comprises:
a component (i) in the form of one or more compounds selected from
compounds of the formula, and any salts thereof:

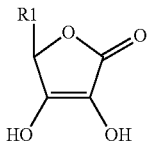

in which R1 corresponds to H, alkyl, monohydroxyalkyl, dihydroxyalkyl, polyhydroxyalkyl, alkylene, alkoxy, amine;
compounds of the formula, and any salts thereof:

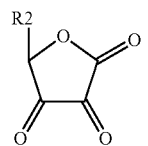

in which R2 corresponds to H, alkyl, monohydroxyalkyl, dihydroxyalkyl, polyhydroxyalkyl, alkylene, alkoxy, amine;
a component (ii) in the form of one or more compounds selected from ammonia, amines or any salts thereof;
a component (iii) in the form of one or more carbohydrates.

Preferably, the binders according to the present invention have a pH of 6-9.

Preferably, alkyl is $C_1$-$C_{10}$ alkyl.
Preferably, monohydroxyalkyl is monohydroxy $C_1$-$C_{10}$ alkyl.
Preferably, dihydroxyalkyl is dihydroxy $C_1$-$C_{10}$ alkyl.
Preferably, polyhydroxyalkyl is polyhydroxy $C_1$-$C_{10}$ alkyl.
Preferably, alkylene is alkylene $C_1$-$C_{10}$ alkyl.
Preferably, alkoxy is alkoxy $C_1$-$C_{10}$ alkyl.
Preferably, the binders according to the present invention are formaldehyde free.

For the purpose of the present application, the term "formaldehyde free" is defined to characterise a mineral wool product where the emission is below 5 $\mu g/m^2/h$ of formaldehyde from the mineral wool product, preferably below 3 $\mu g/m^2/h$. Preferably the test is carried out in accordance with ISO 16000 for testing aldehyde emissions.

Component (i) of the Binder

Preferably, component (i) is in the form of one or more components selected from ascorbic acid or isomers or salts or derivatives, preferably oxidized derivatives, thereof.

The present inventors have surprisingly found, that ascorbic acid, which is a comparatively low-price material and can be produced from biomass, or its derivatives, can be used as a basis for a binder composition for mineral fibres.

Ascorbic acid, or vitamin C, is a non-toxic, naturally occurring organic compound with antioxidant properties. Industrially, ascorbic acid can for example be obtained by fermentation of glucose. The core structure of ascorbic acid contains a unique five-membered ring, a γ-lactone, containing an enediol. Ascorbic acid can thus be classified as a 3,4-dihydroxy-furan-2-one.

Even though ascorbic acid does not contain a carboxylic acid functionality, the 3-hydroxy group is reasonably acidic (pKa=4.04) since the resulting ascorbate anion is stabilized by charge delocalization.

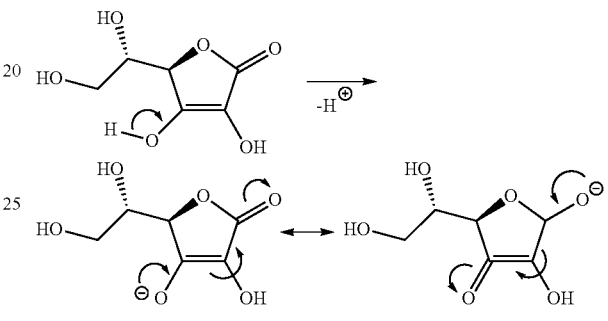

In a preferred embodiment, component (i) is selected from L-ascorbic acid, D-isoascorbic acid, 5,6-isopropylidene ascorbic acid, dehydroascorbic acid and/or any salt of the compounds, preferably calcium, sodium, potassium, magnesium or iron salts.

In a further preferred embodiment, component (i) is selected from L-ascorbic acid, D-isoascorbic acid, 5,6-isopropylidene ascorbic acid and dehydroascorbic acid.

Component (ii) of the Binder

Component (ii) is selected from ammonia, amines or any salts thereof. In a preferred embodiment, component (ii) is selected from ammonia, piperazine, hexadimethylenediamine, m-xylylenediamine, diethylenetriamine, triethylenetetramine, tetraethylenepentamine, monoethanolamine, diethanolamine and/or triethanolamine.

Component (iii) of the Binder

Component (iii) is in form of one or more carbohydrates.

Starch may be used as a raw material for various carbohydrates such as glucose syrups and dextrose. Depending on the reaction conditions employed in the hydrolysis of starch, a variety of mixtures of dextrose and intermediates is obtained which may be characterized by their DE number, DE is an abbreviation for Dextrose Equivalent and is defined as the content of reducing sugars, expressed as the number of grams of anhydrous D-glucose per 100 g of the dry matter in the sample, when determined by the method specified in International Standard ISO 5377-1981 (E). This method measures reducing end groups and attaches a DE of 100 to pure dextrose and a DE of 0 to pure starch.

In a preferred embodiment, the carbohydrate is selected from sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=20-99, such as DE=50-85, such as DE=60-99. The term "dextrose" as used in this application is defined to encompass glucose and the hydrates thereof.

In a particularly preferred embodiment, component (iii) is selected from dextrose, glucose syrup, xylose, fructose or sucrose.

Weight Ratios of the Component of the Aqueous Binder Composition

In a preferred embodiment, the proportion of components (i), (ii) and (iii) is within the range of 1 to 50 weight-% component (i) based on the mass of components (i) and (iii), 50 to 99 weight-% component (iii) based on the mass of components (i) and (iii), and 0.1 to 10.0 molar equivalents of component (ii) relative to component (i).

Component (iv) of the Binder

In a preferred embodiment, the binder composition according to the present invention further comprises a component (iv) in the form of one or more additives. These additives can also be in form of one or more catalysts.

In a particularly preferred embodiment, the additive is a mineral acid or salts thereof, and is preferably present in an amount of 0.05 to 10 weight-%, such as 1 to 7 weight-%, based on the mass of components (i), and (iii), whereby component (ii) is preferably present in the amount of 0.1 to 10 molar equivalents of component (ii) relative to the combined molar equivalents of component (i) and component (iv).

In a particularly preferred embodiment, the additive is selected from the list consisting of ammonium sulfate salts, ammonium phosphate salts, ammonium nitrate salts and ammonium carbonate salts.

Ammonium sulfate salts may include $(NH_4)_2SO_4$, $(NH_4)HSO_4$ and $(NH_4)_2Fe(SO_4)_2 \cdot 6H_2O$.

Ammonium carbonate salts may include $(NH_4)_2CO_3$ and $NH_4HCO_3$.

Ammonium phosphate salts may include $H(NH_4)_2PO_4$, $NH_4H_2PO_4$ and ammonium polyphosphate.

In a particularly preferred embodiment, the additive is selected from the group consisting of sulfuric acid, nitric acid, boric acid, hypophosphorous acid and phosphoric acid, and salts thereof, preferably the sodium salt of hypophosphorous acid.

It has surprisingly been found that by adding a mineral acid such as hypophosphorous acid to the aqueous binder composition, the properties of the aqueous binder composition according to the present invention can be strongly improved.

In particular, the present inventors have found that by including a mineral acid such as hypophosphorous acid or sulfuric acid in the binder composition according to the present invention, the temperature of curing onset and curing endset can be strongly reduced. Further, the reaction loss can be reduced by including a mineral acid, such as hypophosphorous acid or sulfuric acid while at the same time the mechanical properties of the mineral fibre product comprising mineral fibres in contact with the cured binder compositions are retained.

An even lower reaction loss can be achieved by including an ammonium sulfate salt, such as adding sulfuric acid with ammonia, as an additive in the binder composition according to the present invention.

As can be seen from the experimental result documented in the examples below, the aqueous binder composition according to the present invention, even when not containing the component (iv) in form of one or more additives, have a considerably lower reaction loss than the reference binder A. Inclusion of an additive e.g. in form of hypophosphorous acid or a ammonium sulfate salt further reduces this already low reaction loss. The reaction loss achieved by the inclusion of such additives in the binders according to the present invention is on the same level than the reaction loss for reference binders B, C and D (see examples below). However, unlike the binders according to the present invention, these reference binders B, C and D need a pre-reaction for the preparation of the binders.

Accordingly, the binders according to the present invention are clearly advantageous over the binders known from the prior art. On the one hand, the reaction loss for the binders according to the present invention is clearly lower than the reaction loss for reference binder A (see Examples below). On the other hand, the binders according to the present invention achieve the same low reaction loss than the reference binders B, C and D (see Examples below), while at the same time not needing a pre-reaction. The combination of a low reaction loss and the absence of the need to pre-react the components is not achieved by any of the prior art binders.

Component (v) of the Binder

Optionally, the aqueous binder composition according to the present invention comprises a further component (v), which is in form of one or more reactive or non-reactive silicones.

In a preferred embodiment, the component (v) is selected from the group consisting of silicone constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the binder composition and is preferably present in an amount of 0.1 to 15 weight-%, preferably 0.1 to 10 weight-%, more preferably 0.3 to 8 weight-%, based on the binder solids.

Component (vi) of the Binder

Optionally, the aqueous binder composition according to the present invention further comprises a component (vi) in form of urea, preferably in an amount of 0 to 40 weight-% urea, preferably 0 to 20 weight-% urea, based on the mass of components (i), and (iii).

Further Components of the Binder Composition

Optionally, the aqueous binder composition according to the present invention can contain further components besides the components (i), (ii), (iii), (iv), (v) and (vi) mentioned above. However, in a preferred embodiment >95 weight-% of the total solids content of the composition is formed by component (i), component (ii), component (iii), component (iv), component (v) and component (vi), based on the binder component solids content.

In other words, any further components, if present, are present preferably in an amount of <5 weight-% of the total binder component solids content of the binder composition.

The present invention is also directed to a method of producing a bonded mineral fiber product which comprises the steps of contacting the mineral fibers with the binder composition according to the present invention, and curing the binder composition.

The present invention is also directed to a mineral fibre product, comprising mineral fibres in contact with the cured binder composition described above.

Mineral Fibre Product

The mineral fibres employed may be any of man-made vitreous fibres (MMVF), glass fibres, ceramic fibres, basalt fibres, slag fibres, rock fibres, stone fibres and others. These fibres may be present as a wool product, e.g. like a rock wool product.

Suitable fibre formation methods and subsequent production steps for manufacturing the mineral fibre product are those conventional in the art. Generally, the binder is sprayed immediately after fibrillation of the mineral melt on to the air-borne mineral fibres. The aqueous binder composition is normally applied in an amount of 0.1 to 18%, preferably 0.2 to 8% by weight, of the bonded mineral fibre product on a dry basis.

The spray-coated mineral fibre web is generally cured in a curing oven by means of a hot air stream. The hot air stream may be introduced into the mineral fibre web from below, or above or from alternating directions in distinctive zones in the length direction of the curing oven.

Typically, the curing oven is operated at a temperature of from about 150° C. to about 350° C. Preferably, the curing temperature ranges from about 200 to about 300° C. Generally, the curing oven residence time is from 30 seconds to 20 minutes, depending on, for instance, the product density.

If desired, the mineral wool web may be subjected to a shaping process before curing. The bonded mineral fibre product emerging from the curing oven may be cut to a desired format e.g., in the form of a batt. Thus, the mineral fibre products produced, for instance, have the form of woven and nonwoven fabrics, mats, batts, slabs, sheets, plates, strips, rolls, granulates and other shaped articles which find use, for example, as thermal or acoustical insulation materials, vibration damping, construction materials, facade insulation, reinforcing materials for roofing or flooring applications, as filter stock, as horticultural growing media and in other applications.

In accordance with the present invention, it is also possible to produce composite materials by combining the bonded mineral fibre product with suitable composite layers or laminate layers such as, e.g., metal, glass surfacing mats and other woven or non-woven materials.

The mineral fibre products according to the present invention generally have a density within the range of from 6 to 250 kg/m$^3$, preferably 20 to 200 kg/m$^3$. The mineral fibre products generally have a loss on ignition (LOI) within the range of 0.3 to 18.0%, preferably 0.5 to 8.0%.

Although the aqueous binder composition according to the present invention is particularly useful for bonding mineral fibres, it may equally be employed in other applications typical for binders and sizing agents, e.g. as a binder for foundry sand, chipboard, glass fibre tissue, cellulosic fibres, non-woven paper products, composites, moulded articles, coatings etc.

The following examples are intended to further illustrate the invention without limiting its scope.

EXAMPLES

In the following examples, several binders which fall under the definition of the present invention were prepared and compared to binders according to the prior art.

The following properties were determined for the binders according to the present invention and the binders according to the prior art, respectively:

Binder Component Solids Content

The content of each of the components in a given binder solution before curing is based on the anhydrous mass of the components.

Except for calcium ascorbate dihydrate (Sigma Aldrich), 28% aq. ammonia (Sigma Aldrich), 75% aq. glucose syrup with a DE-value of 95 to less than 100 (C*sweet D 02767 ex Cargill), and 50% aq. hypophosporous acid (Sigma Aldrich), all other components were supplied in high purity by Sigma-Aldrich.

Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The binder solids of a given binder solution was measured by distributing two samples of the binder solution (each approx. 2.0 g) onto two of the heat treated stone wool discs which were weighed before and after application of the binder solution. The binder loaded stone wool discs were then heated at 200° C. for 1 hour. After cooling and storing at room temperature for 10 minutes, the samples were weighed and the binder solids was calculated as an average of the two results. A binder with a desired binder solids could then be produced by diluting with the required amount of water or water and 10% aq. silane (Momentive VS-142).

Reaction Loss

The reaction loss is defined as the difference between the binder component solids content and the binder solids.

Curing Characteristics—DMA (Dynamic Mechanical Analysis) Measurements

A 15% binder solids binder solution was obtained as described above. Cut and weighed glass Whatman™ glass microfiber filters (GF/B, 150 mm Ø, cat. no. 1821 150) (2.5×1 cm) were submerged into the binder solution for 10 seconds. The resulting binder-soaked filter was then dried in a "sandwich" consisting of (1) a 0.60 kg 8×8×1 cm metal plate, (2) four layers of standard filter papers, (3) the binder soaked glass microfiber filter, (4) four layers of standard filter papers, (5) a 0.60 kg 8×8×1 cm metal plate for approximately 2×2 minutes by applying a weight of 3.21 kg on top of the "sandwich". In a typical experiment, the cut Whatman™ glass microfiber filter would weigh 0.035 g before application of the binder and 0.125 g after application and drying which corresponds to a binder solution loading of 72%. All DMA measurements were performed with 72±1% binder solution loadings.

The DMA measurements were acquired on a Mettler Toledo DMA 1 calibrated against a certified thermometer at ambient temperature and the melting points of certified indium and tin. The apparatus was operated in single cantilever bending mode; titanium clamps; clamp distance 1.0 cm; temperature segment type; temperature range 40-280° C.; heating rate 3° C./min; displacement 20 μm; frequency 1 Hz; single frequency oscillation mode. Curing onset and endset were evaluated using STARe software Version 12.00.

Mechanical Strength Studies

The mechanical strength of the binders was tested in a tablet test. For each binder, four tablets were manufactured from a mixture of the binder and stone wool shots from the stone wool spinning production. The shots are particles which have the same melt composition as the stone wool fibers, and the shots are normally considered a waste product from the spinning process. The shots used for the tablet composition have a size of 0.25-0.50 mm.

A 15% binder solids binder solution containing 0.5% silane (Momentive VS-142) of binder solids was obtained as described above. Four samples of the binder solution (each 4.0 g) were then mixed well with four samples of shots (each 20.0 g). The resulting four mixtures were then transferred into four round aluminum foil containers (bottom Ø=4.5 cm, top Ø=7.5 cm, height=1.5 cm). One by one, the mixtures were then pressed hard with a suitably sized flat bottom glass beaker to generate an even tablet surface. The resulting tablets were then cured at 250° C. for 1 h. After cooling to room temperature, the tablets were carefully taken out of the containers. Two of the four tablets were then submerged into a water bath at 80° C. for 3 h to simulate aging. After drying for 1-2 days, the tablets were manually broken in two halves whereby the capacity of the given binder to bind shots together could be evaluated. The binders were given the notes strong (*), medium () or weak (*).

For the investigation of properties of the binders according to the present invention, a high number of binder compositions according to the present invention has been prepared and used to bind mineral shots and has been compared with the corresponding results for binders according to the prior art.

The results of the evaluation of the binders according to the present invention and the binders according to the prior art are summarized in Table 1.

Reference Binders from the Prior Art Prepared as Comparative Examples

Binder Example, Reference Binder A

A mixture of anhydrous citric acid (1.7 g, 8.84 mmol) and dextrose monohydrate (9.55 g; thus efficiently 8.68 g, 48.2 mmol dextrose) in water (26.3 g) was stirred at room temperature until a clear solution was obtained. 28% aq. ammonia (1.30 g; thus efficiently 0.36 g, 21.4 mmol ammonia) was then added dropwise (pH=5.18. The binder solids was then measured (16.8%).

For DMA studies (15% binder solids solution), the binder mixture was diluted with water (0.121 g/g binder mixture). For mechanical strength studies (15% binder solids solution, 0.5% silane of binder solids), the binder mixture was diluted with water (0.113 g/g binder mixture) and 10% aq. silane (0.008 g/g binder mixture). The final binder mixture for mechanical strength studies had pH=5.0.

Binder Example, Reference Binder B

This binder is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

$$AT=(\text{Used titration volume (mL)})/(\text{Sample volume (mL)})$$

Using the urea-modified phenol-formaldehyde resin obtained, a binder is made by addition of 25% aq. ammonia (90 mL) and ammonium sulfate (13.2 g) followed by water (1.30 kg).

The binder solids was then measured as described above and the mixture was diluted with the required amount of water for DMA measurements (15% binder solids solution) or water and silane (15% binder solids solution, 0.5% silane of binder solids) for mechanical strength measurements.

Binder Example, Reference Binder C

This binder is based on alkanolamine-polycarboxylic acid anhydride reaction products.

Diethanolamine (DEA, 231.4 g) is placed in a 5-litre glass reactor provided with a stirrer and a heating/cooling jacket. The temperature of the diethanolamine is raised to 60° C. where after tetrahydrophthalic anhydride (THPA, 128.9 g) is added. After raising the temperature and keeping it at 130° C., a second portion of tetrahydrophthalic anhydride (64.5 g) is added followed by trimellitic anhydride (TMA, 128.9 g).

After reacting at 130° C. for 1 hour, the mixture is cooled to 95° C. Water (190.8 g) is added and stirring is continued for 1 hour. After cooling to ambient temperature, the mixture is poured into water (3.40 kg) and 50% aq. hypophosphorous acid (9.6 g) and 25% aq. ammonia (107.9 g) are added under stirring. Glucose syrup (1.11 kg) is heated to 60° C. and then added under stirring followed by 50% aq. silane (Momentive VS-142) (5.0 g).

The binder solids was then measured as described above and the mixture was diluted with the required amount of water for DMA and mechanical strength measurements (15% binder solids solutions).

Binder Example, Reference Binder D

This binder is based on alkanolamine-polycarboxylic acid anhydride reaction products.

Diethanolamine (DEA, 120.5 g) is placed in a 5-litre glass reactor provided with a stirrer and a heating/cooling jacket. The temperature of the diethanolamine is raised to 60° C. where after tetrahydrophthalic anhydride (THPA, 67.1 g) is added. After raising the temperature and keeping it at 130° C., a second portion of tetrahydrophthalic anhydride (33.6 g) is added followed by trimellitic anhydride (TMA, 67.1 g). After reacting at 130° C. for 1 hour, the mixture is cooled to 95° C. Water (241.7 g) is added and stirring is continued for 1 hour. Urea (216.1 g) is then added and stirring is continued until all solids are dissolved. After cooling to ambient temperature, the mixture is poured into water (3.32 kg) and 50% aq. hypophosphorous acid (5.0 g) and 25% aq. ammonia (56.3 g) are added under stirring.

Glucose syrup (1.24 kg) is heated to 60° C. and then added under stirring followed by 50% aq. silane (Momentive VS-142) (5.0 g).

The binder solids was then measured as described above and the mixture was diluted with the required amount of water for DMA and mechanical strength measurements (15% binder solids solutions).

Binders Compositions According to the Present Invention

In the following, the entry number of the binder examples corresponds to the entry number used in Table 1.

Binder Example, Entry 2

A mixture of L-ascorbic acid (3.75 g, 21.3 mmol) and 75.1% aq. glucose syrup (15.0 g; thus efficiently 11.3 g glucose syrup) in water (31.3 g) was stirred at room temperature until a clear solution was obtained (pH 1.9). 28% aq. ammonia (1.64 g; thus efficiently 0.46 g, 27.0 mmol ammonia) was then added dropwise until pH=6.1. The binder solids was then measured (18.6%).

For DMA studies (15% binder solids solution), the binder mixture was diluted with water (0.240 g/g binder mixture). For mechanical strength studies (15% binder solids solution, 0.5% silane of binder solids), the binder mixture was diluted with water (0.231 g/g binder mixture) and 10% aq. silane (0.009 g/g binder mixture). The final binder mixture for mechanical strength studies had pH=6.1.

Binder Example, Entry 12

A mixture of L-ascorbic acid (1.50 g, 8.52 mmol) and 75.1% aq. glucose syrup (18.0 g; thus efficiently 13.5 g glucose syrup) in water (30.5 g) was stirred at room temperature until a clear solution was obtained (pH 1.8). 28% aq. ammonia (0.76 g; thus efficiently 0.21 g, 12.5 mmol ammonia) was then added dropwise until pH=6.7. The binder solids was then measured (18.8%).

For DMA studies (15% binder solids solution), the binder mixture was diluted with water (0.250 g/g binder mixture). For mechanical strength studies (15% binder solids solution, 0.5% silane of binder solids), the binder mixture was diluted with water (0.241 g/g binder mixture) and 10% aq. silane (0.009 g/g binder mixture). The final binder mixture for mechanical strength studies had pH=6.7.

Binder Example, Entry 19

A mixture of L-ascorbic acid (3.75 g, 21.3 mmol) and 75.1% aq. glucose syrup (15.0 g; thus efficiently 11.3 g glucose syrup) in water (31.3 g) was stirred at room temperature until a clear solution was obtained (pH 2.0). Triethanolamine (3.22 g, 21.6 mmol) was then added dropwise until pH=6.1. The binder solids was then measured (18.6%).

For DMA studies (15% binder solids solution), the binder mixture was diluted with water (0.238 g/g binder mixture). For mechanical strength studies (15% binder solids solution, 0.5% silane of binder solids), the binder mixture was diluted with water (0.229 g/g binder mixture) and 10% aq. silane (0.009 g/g binder mixture). The final binder mixture for mechanical strength studies had pH=6.1.

Binder Example, Entry 23

A mixture of L-ascorbic acid (3.75 g, 21.3 mmol) and 75.1% aq. glucose syrup (15.0 g; thus efficiently 11.3 g glucose syrup) in water (31.3 g) was stirred at room temperature until a clear solution was obtained (pH 1.8). 28% aq. ammonia (1.89 g; thus efficiently 0.53 g, 31.1 mmol) was then added dropwise until pH=8.5. The binder solids was then measured (19.1%).

For DMA studies (15% binder solids solution), the binder mixture was diluted with water (0.272 g/g binder mixture). For mechanical strength studies (15% binder solids solution, 0.5% silane of binder solids), the binder mixture was diluted with water (0.262 g/g binder mixture) and 10% aq. silane (0.010 g/g binder mixture). The final binder mixture for mechanical strength studies had pH=8.5.

Binder Example, Entry 25

A mixture of L-ascorbic acid (3.75 g, 21.3 mmol) and xylose (11.3 g, 62.5 mmol) in water (35.0 g) was stirred at room temperature until a clear solution was obtained (pH 2.0). 28% aq. ammonia (1.72 g; thus efficiently 0.48 g, 28.3 mmol) was then added dropwise until pH=6.0. The binder solids was then measured (17.5%).

For DMA studies (15% binder solids solution), the binder mixture was diluted with water (0.168 g/g binder mixture). For mechanical strength studies (15% binder solids solution, 0.5% silane of binder solids), the binder mixture was diluted with water (0.159 g/g binder mixture) and 10% aq. silane (0.009 g/g binder mixture). The final binder mixture for mechanical strength studies had pH=6.0.

Binder Example, Entry 30

A mixture of dehydroascorbic acid (3.75 g, 21.5 mmol) and 75.1% aq. glucose syrup (15.0 g; thus efficiently 11.3 g glucose syrup) in water (31.3 g) was stirred at room temperature until a clear solution was obtained (pH 1.6). 28% aq. ammonia (5.11 g; thus efficiently 1.43 g, 84.0 mmol) was then added dropwise until pH=6.4. The binder solids was then measured (18.8%).

For DMA studies (15% binder solids solution), the binder mixture was diluted with water (0.253 g/g binder mixture). For mechanical strength studies (15% binder solids solution, 0.5% silane of binder solids), the binder mixture was diluted with water (0.244 g/g binder mixture) and 10% aq. silane (0.009 g/g binder mixture). The final binder mixture for mechanical strength studies had pH=6.4.

Binder Example, Entry 38

A mixture of L-ascorbic acid (1.50 g, 8.52 mmol) and 75.1% aq. glucose syrup (18.0 g; thus efficiently 13.5 g glucose syrup) in water (30.5 g) was stirred at room temperature until a clear solution was obtained. 50% aq. hypophosphorous acid (0.60 g; thus efficiently 0.30 g, 4.55 mmol hypophosphorous acid) was then added (pH 1.3). 28% aq. ammonia (0.99 g; thus efficiently 0.28 g, 16.3 mmol ammonia) was then added dropwise until pH=6.7. The binder solids was then measured (20.1%).

For DMA studies (15% binder solids solution), the binder mixture was diluted with water (0.341 g/g binder mixture). For mechanical strength studies (15% binder solids solution, 0.5% silane of binder solids), the binder mixture was diluted with water (0.331 g/g binder mixture) and 10% aq. silane (0.010 g/g binder mixture). The final binder mixture for mechanical strength studies had pH=6.4.

The other binders mentioned in Table 1 were prepared in a manner analogous to the preparation shown above.

TABLE 1-1

| Entry | Reference binders | | | | Ascorbic acid or deriv., glucose syrup, ammonia | | | | | | |
|---|---|---|---|---|---|---|---|---|---|---|---|
| | A | B | C | D | 1 | 2 | 3 | 4 | 5 | 6 | 7 |
| Binder composition | | | | | | | | | | | |
| *Ascorbic acid or deriv. (%-wt.) [a]* | | | | | | | | | | | |
| L-Ascorbic acid | — | — | — | — | 100 | 25 | — | — | 100 | 25 | — |
| D-Isoascorbic acid | — | — | — | — | — | — | — | — | — | — | — |
| Calcium ascorbate | — | — | — | — | — | — | 25 | — | — | — | — |
| Sodium ascorbate | — | — | — | — | — | — | — | 25 | — | — | — |
| Dehydroascorbic acid | — | — | — | — | — | — | — | — | — | — | — |
| 5,6-Isopropylidene ascorbic acid | — | — | — | — | — | — | — | — | — | — | — |
| *Carbohydrate (%-wt.) [a]* | | | | | | | | | | | |
| Glucose syrup | — | — | — | — | — | 75 | 75 | 75 | — | 75 | 100 |
| Xylose | — | — | — | — | — | — | — | — | — | — | — |
| Fructose | — | — | — | — | — | — | — | — | — | — | — |
| Sucrose | — | — | — | — | — | — | — | — | — | — | — |
| *Additive (%-wt.) [a]* | | | | | | | | | | | |
| Urea | — | — | — | — | — | — | — | — | — | — | — |
| Hypophosphorous acid | — | — | — | — | — | — | — | — | — | — | — |
| Sulfuric acid | — | — | — | — | — | — | — | — | — | — | — |
| Phosphoric acid | — | — | — | — | — | — | — | — | — | — | — |
| Boric acid | — | — | — | — | — | — | — | — | — | — | — |
| *Amine (equiv.) [b]* | | | | | | | | | | | |
| Ammonia | — | — | — | — | 1.4 | 1.3 | — | — | — | — | — |
| Piperazine | — | — | — | — | — | — | — | — | — | — | — |
| Hexamethylenediamine | — | — | — | — | — | — | — | — | — | — | — |
| m-Xylylenediamine | — | — | — | — | — | — | — | — | — | — | — |
| Diethylenetriamine | — | — | — | — | — | — | — | — | — | — | — |
| Diethanolamine | — | — | — | — | — | — | — | — | — | — | — |
| Triethanolamine | — | — | — | — | — | — | — | — | — | — | — |
| Binder properties | | | | | | | | | | | |
| Curing onset (° C.) | 144 | 159 | 178 | 196 | 167 | 171 | 181 | 185 | 193 | 212 | 221 |
| Curing endset (° C.) | 166 | 172 | 210 | 220 | 183 | 194 | 212 | 207 | 208 | 239 | 247 |
| Reaction loss (%) | 39.3 | 28.5 | 28.9 | 30.6 | 40.4 | 37.8 | 41.8 | 44.2 | 30.4 | 28.6 | — |
| pH of 15% soln. | 5.0 | 10.0 | 6.1 | 6.2 | 5.9 | 6.1 | 6.8 | 7.1 | 1.8 | 2.2 | 8.4 |
| Mechanical strength, unaged | *** | *** | *** | ** | * | *** | * | * | * | * | *** |
| Mechanical strength, aged | ** | ** | *** | ** | * | ** | * | * | * | * | ** |

| Entry | Asorbic acid + glucose syrup + ammonia | | | | | | |
|---|---|---|---|---|---|---|---|
| | 8 | 9 | 2 | 10 | 11 | 12 | 13 |
| Binder composition | | | | | | | |
| *Ascorbic acid or deriv. (%-wt.) [a]* | | | | | | | |
| L-Ascorbic acid | 50 | 75 | 25 | 20 | 15 | 10 | 5 |
| D-Isoascorbic acid | — | — | — | — | — | — | — |
| Calcium ascorbate | — | — | — | — | — | — | — |
| Sodium ascorbate | — | — | — | — | — | — | — |
| Dehydroascorbic acid | — | — | — | — | — | — | — |
| 5,6-Isopropylidene ascorbic acid | — | — | — | — | — | — | — |
| *Carbohydrate (%-wt.) [a]* | | | | | | | |
| Glucose syrup | 50 | 25 | 75 | 80 | 85 | 90 | 95 |
| Xylose | — | — | — | — | — | — | — |
| Fructose | — | — | — | — | — | — | — |
| Sucrose | — | — | — | — | — | — | — |
| *Additive (%-wt.) [a]* | | | | | | | |
| Urea | — | — | — | — | — | — | — |
| Hypophosphorous acid | — | — | — | — | — | — | — |
| Sulfuric acid | — | — | — | — | — | — | — |
| Phosphoric acid | — | — | — | — | — | — | — |
| Boric acid | — | — | — | — | — | — | — |
| *Amine (equiv.) [b]* | | | | | | | |
| Ammonia | 1.1 | 1.1 | 1.3 | 1.4 | 1.3 | 1.5 | 1.5 |
| Piperazine | — | — | — | — | — | — | — |
| Hexamethylenediamine | — | — | — | — | — | — | — |
| m-Xylylenediamine | — | — | — | — | — | — | — |

TABLE 1-1-continued

|  | | | | | | | |
|---|---|---|---|---|---|---|---|
| Diethylenetriamine | — | — | — | — | — | — | — |
| Diethanolamine | — | — | — | — | — | — | — |
| Triethanolamine | — | — | — | — | — | — | — |
| Binder properties | | | | | | | |
| Curing onset (° C.) | 160 | 167 | 171 | 184 | 193 | 202 | 208 |
| Curing endset (° C.) | 184 | 183 | 194 | 202 | 209 | 218 | 228 |
| Reaction loss (%) | 40.4 | 41.0 | 37.8 | 37.9 | 38.0 | 37.4 | 39.3 |
| pH of 15% soln. | 6.1 | 6.1 | 6.1 | 6.4 | 6.2 | 6.7 | 7.5 |
| Mechanical strength, unaged | * | — | *** | *** | *** | *** | *** |
| Mechanical strength, aged | * | — | ** | *** | *** | *** | ** |

[a] Of ascorbic acid (or derivative) + carbohydrate.
[b] Molar equivalents relative to ascorbic acid (or derivative) + mineral acid.

TABLE 1-2

| | Ascorbic acid + glucose syrup + amine | | | | | | | Ascorbic acid + glucose syrup + amine, pH | | | | | |
|---|---|---|---|---|---|---|---|---|---|---|---|---|---|
| Entry | 14 | 15 | 16 | 2 | 17 | 18 | 19 | 20 | 21 | 22 | 23 | 2 | 24 |
| Binder composition | | | | | | | | | | | | | |
| Ascorbic acid or deriv. (%-wt.) [a] | | | | | | | | | | | | | |
| L-Ascorbic acid | 25 | 25 | 25 | 25 | 25 | 25 | 25 | 25 | 25 | 25 | 25 | 25 | 25 |
| D-Isoascorbic acid | — | — | — | — | — | — | — | — | — | — | — | — | — |
| Calcium ascorbate | — | — | — | — | — | — | — | — | — | — | — | — | — |
| Sodium ascorbate | — | — | — | — | — | — | — | — | — | — | — | — | — |
| Dehydroascorbic acid | — | — | — | — | — | — | — | — | — | — | — | — | — |
| 5,6-Isopropylidene ascorbic acid | — | — | — | — | — | — | — | — | — | — | — | — | — |
| Carbohydrate (%-wt.) [a] | | | | | | | | | | | | | |
| Glucose syrup | 75 | 75 | 75 | 75 | 75 | 75 | 75 | 75 | 75 | 75 | 75 | 75 | 75 |
| Xylose | — | — | — | — | — | — | — | — | — | — | — | — | — |
| Fructose | — | — | — | — | — | — | — | — | — | — | — | — | — |
| Sucrose | — | — | — | — | — | — | — | — | — | — | — | — | — |
| Additive (%-wt.) [a] | | | | | | | | | | | | | |
| Urea | — | — | — | — | — | — | — | — | — | — | — | — | — |
| Hypophosphorous acid | — | — | — | — | — | — | — | — | — | — | — | — | — |
| Sulfuric acid | — | — | — | — | — | — | — | — | — | — | — | — | — |
| Phosphoric acid | — | — | — | — | — | — | — | — | — | — | — | — | — |
| Boric acid | — | — | — | — | — | — | — | — | — | — | — | — | — |
| Amine (equiv.) [b] | | | | | | | | | | | | | |
| Ammonia | — | — | — | 1.3 | — | — | — | — | — | — | 1.5 | 1.3 | 1.0 |
| Piperazine | 1.3 | — | — | — | — | — | — | — | — | — | — | — | — |
| Hexamethylenediamine | — | 1.0 | — | — | — | — | — | 1.0 | 1.0 | 0.9 | — | — | — |
| m-Xylylenediamine | — | — | 1.0 | — | — | — | — | — | — | — | — | — | — |
| Diethylenetriamine | — | — | — | — | 1.4 | — | — | — | — | — | — | — | — |
| Diethanolamine | — | — | — | — | — | 1.0 | — | — | — | — | — | — | — |
| Triethanolamine | — | — | — | — | — | — | 1.0 | — | — | — | — | — | — |
| Binder properties | | | | | | | | | | | | | |
| Curing onset (° C.) | 147 | 168 | 171 | 171 | 182 | 183 | 191 | 168 | 168 | 172 | 170 | 171 | 174 |
| Curing endset (° C.) | 174 | 194 | 195 | 194 | 201 | 208 | 212 | 194 | 194 | 196 | 194 | 194 | 196 |
| Reaction loss (%) | 43.0 | 38.2 | 33.3 | 37.8 | 37.0 | 44.1 | 45.7 | 38.2 | 36.0 | 36.0 | 36.2 | 37.8 | 36.3 |
| pH of 15% soln. | 5.5 | 6.4 | 6.2 | 6.1 | 5.7 | 6.2 | 6.1 | 6.4 | 8.1 | 5.0 | 8.5 | 6.1 | 5.2 |
| Mechanical strength, unaged | * | ** | ** | *** | ** | *** | *** | ** | *** | *** | *** | *** | ** |
| Mechanical strength, aged | * | ** | ** | ** | * | *** | *** | ** | ** | ** | ** | ** | ** |

[a] Of ascorbic acid (or derivative) + carbohydrate.
[b] Molar equivalents relative to ascorbic acid (or derivative) + mineral acid.

TABLE 1-3

| | Ascorbic acid + carbohydrate + ammonia | | | | Ascorbic acid derivative + glucose syrup + ammonia | | | | | |
|---|---|---|---|---|---|---|---|---|---|---|
| Entry | 25 | 2 | 26 | 27 | 2 | 28 | 29 | 30 | 31 | 32 |
| Binder composition | | | | | | | | | | |
| Ascorbic acid or deny. (%-wt.) | | | | | | | | | | |
| L-Ascorbic acid | 25 | 25 | 25 | 25 | 25 | — | 18.8 | — | 18.8 | — |
| D-Isoascorbic acid | — | — | — | — | — | 25 | — | — | — | — |
| Calcium ascorbate | — | — | — | — | — | — | 6.2 | — | — | — |
| Sodium ascorbate | — | — | — | — | — | — | — | — | 6.2 | — |
| Dehydroascorbic acid | — | — | — | — | — | — | — | 25 | — | — |
| 5,6-Isopropylidene ascorbic acid | — | — | — | — | — | — | — | — | — | 25 |
| Carbohydrate (%-wt.) | | | | | | | | | | |
| Glucose syrup | — | 75 | — | — | 75 | 75 | 75 | 75 | 75 | 75 |
| Xylose | 75 | — | — | — | — | — | — | — | — | — |
| Fructose | — | — | 75 | — | — | — | — | — | — | — |
| Sucrose | — | — | — | 75 | — | — | — | — | — | — |
| Additive (%-wt.) [a] | | | | | | | | | | |
| Urea | — | — | — | — | — | — | — | — | — | — |
| Hypophosphorous acid | — | — | — | — | — | — | — | — | — | — |
| Sulfuric acid | — | — | — | — | — | — | — | — | — | — |
| Phosphoric acid | — | — | — | — | — | — | — | — | — | — |
| Boric acid | — | — | — | — | — | — | — | — | — | — |
| Amine (equiv.) [a] | | | | | | | | | | |
| Ammonia | 1.3 | 1.3 | 1.3 | 1.4 | 1.3 | 1.3 | 1.1 | 3.9 | 1.1 | 1.7 |
| Piperazine | — | — | — | — | — | — | — | — | — | — |
| Hexamethylenediamine | — | — | — | — | — | — | — | — | — | — |
| m-Xylylenediamine | — | — | — | — | — | — | — | — | — | — |
| Diethylenetriamine | — | — | — | — | — | — | — | — | — | — |
| Diethanolamine | — | — | — | — | — | — | — | — | — | — |
| Triethanolamine | — | — | — | — | — | — | — | — | — | — |
| Binder properties | | | | | | | | | | |
| Curing onset (° C.) | 166 | 171 | 184 | 197 | 171 | 173 | 176 | 181 | 181 | 185 |
| Curing endset (° C.) | 185 | 194 | 207 | 221 | 194 | 197 | 197 | 203 | 199 | 204 |
| Reaction loss (%) | 41.5 | 37.8 | 40.8 | 36.9 | 37.8 | 37.9 | 37.6 | 36.9 | 38.3 | 40.2 |
| pH of 15% soln. | 6.0 | 6.1 | 6.4 | 6.4 | 6.1 | 6.3 | 6.1 | 6.4 | 6.2 | 6.1 |
| Mechanical strength, unaged | ** | *** | ** | *** | *** | *** | *** | ** | *** | *** |
| Mechanical strength, aged | ** | ** | ** | ** | ** | ** | ** | ** | ** | *** |

[a] Of ascorbic acid (or derivative) + carbohydrate.
[b] Molar equivalents relative to ascorbic acid (or derivative) + mineral acid.

TABLE 1-4

| | Ascorbic acid + glucose syrup + mineral acid + ammonia | | | | | | | | | | | | | | | |
|---|---|---|---|---|---|---|---|---|---|---|---|---|---|---|---|---|
| Entry | 33 | 34 | 35 | 36 | 2 | 37 | 38 | 39 | 40 | 41 | 42 | 43 | 12 | 44 | 13 | 45 |
| Binder composition | | | | | | | | | | | | | | | | |
| Ascorbic acid or deny. (%-wt.) [a] | | | | | | | | | | | | | | | | |
| L-Ascorbic acid | 25 | 25 | 25 | 25 | 25 | 10 | 10 | 10 | 10 | 10 | 10 | 10 | 10 | 5 | 5 | — |
| D-Isoascorbic acid | — | — | — | — | — | — | — | — | — | — | — | — | — | — | — | — |
| Calcium ascorbate | — | — | — | — | — | — | — | — | — | — | — | — | — | — | — | — |
| Sodium ascorbate | — | — | — | — | — | — | — | — | — | — | — | — | — | — | — | — |
| Dehydroascorbic acid | — | — | — | — | — | — | — | — | — | — | — | — | — | — | — | — |
| 5,6-Isopropylidene ascorbic acid | — | — | — | — | — | — | — | — | — | — | — | — | — | — | — | — |
| Carbohydrate (%-wt.) [a] | | | | | | | | | | | | | | | | |
| Glucose syrup | 75 | 75 | 75 | 75 | 75 | 90 | 90 | 90 | 90 | 90 | 90 | 90 | 90 | 95 | 95 | 100 |
| Xylose | — | — | — | — | — | — | — | — | — | — | — | — | — | — | — | — |
| Fructose | — | — | — | — | — | — | — | — | — | — | — | — | — | — | — | — |
| Sucrose | — | — | — | — | — | — | — | — | — | — | — | — | — | — | — | — |
| Additive (%-wt.) [a] | | | | | | | | | | | | | | | | |
| Urea | — | — | — | — | — | — | — | — | — | — | — | — | — | — | — | — |
| Hypophosphorous acid | 5 | 2 | 1 | 0.5 | — | 5 | 2 | — | — | 1 | 0.5 | — | — | 5 | — | 2 |
| Sulfuric acid | — | — | — | — | — | — | — | 2 | — | — | — | — | — | — | — | — |
| Phosphoric acid | — | — | — | — | — | — | — | — | 2 | — | — | — | — | — | — | — |
| Boric acid | — | — | — | — | — | — | — | — | — | — | — | 2 | — | — | — | — |

TABLE 1-4-continued

| | Ascorbic acid + glucose syrup + mineral acid + ammonia | | | | | | | | | | | | | | | |
|---|---|---|---|---|---|---|---|---|---|---|---|---|---|---|---|---|
| Entry | 33 | 34 | 35 | 36 | 2 | 37 | 38 | 39 | 40 | 41 | 42 | 43 | 12 | 44 | 13 | 45 |
| Amine (equiv.) [b] | | | | | | | | | | | | | | | | |
| Ammonia | 1.1 | 1.2 | 1.2 | 1.2 | 1.3 | 1.2 | 1.2 | 1.5 | 1.4 | 1.4 | 1.2 | 1.1 | 1.5 | 1.2 | 1.5 | 1.7 |
| Piperazine | — | — | — | — | — | — | — | — | — | — | — | — | — | — | — | — |
| Hexamethylenediamine | — | — | — | — | — | — | — | — | — | — | — | — | — | — | — | — |
| m-Xylylenediamine | — | — | — | — | — | — | — | — | — | — | — | — | — | — | — | — |
| Diethylenetriamine | — | — | — | — | — | — | — | — | — | — | — | — | — | — | — | — |
| Diethanolamine | — | — | — | — | — | — | — | — | — | — | — | — | — | — | — | — |
| Triethanolamine | — | — | — | — | — | — | — | — | — | — | — | — | — | — | — | — |
| Binder properties | | | | | | | | | | | | | | | | |
| Curing onset (° C.) | 139 | 144 | 159 | 166 | 171 | 148 | 172 | 175 | 185 | 187 | 196 | 200 | 202 | 155 | 208 | 205 |
| Curing endset (° C.) | 157 | 179 | 190 | 193 | 194 | 169 | 193 | 199 | 203 | 206 | 214 | 221 | 218 | 175 | 228 | 236 |
| Reaction loss (%) | 33.8 | 35.6 | 36.2 | 36.8 | 37.8 | 33.8 | 33.4 | 30.8 | 34.7 | 33.5 | 34.8 | 30.8 | 37.4 | 34.0 | 39.3 | 28.0 |
| pH of 15% soln. | 6.1 | 6.0 | 6.3 | 6.1 | 6.1 | 6.4 | 6.4 | 6.2 | 6.1 | 6.5 | 6.5 | 6.2 | 6.7 | 6.3 | 7.5 | 8.4 |
| Mechanical strength, unaged | ** | *** | ** | *** | *** | *** | *** | *** | ** | *** | *** | *** | *** | ** | *** | *** |
| Mechanical strength, aged | ** | ** | ** | ** | ** | ** | *** | ** | * | ** | *** | *** | *** | * | ** | * |

[a] Of ascorbic acid (or derivative) + carbohydrate.
[b] Molar equivalents relative to ascorbic acid (or derivative) + mineral acid.

TABLE 1-5

| | Ascorbic acid + glucose syrup + mineral acid and/or urea + ammonia | | | | | | | | | |
|---|---|---|---|---|---|---|---|---|---|---|
| Entry | 46 | 34 | 47 | 48 | 2 | 49 | 38 | 50 | 51 | 12 |
| Binder composition | | | | | | | | | | |
| Ascorbic acid or deny. (%-wt.) [a] | | | | | | | | | | |
| L-Ascorbic acid | 25 | 25 | 25 | 25 | 25 | 10 | 10 | 10 | 10 | 10 |
| D-Isoascorbic acid | — | — | — | — | — | — | — | — | — | — |
| Calcium ascorbate | — | — | — | — | — | — | — | — | — | — |
| Sodium ascorbate | — | — | — | — | — | — | — | — | — | — |
| Dehydroascorbic acid | — | — | — | — | — | — | — | — | — | — |
| 5,6-Isopropylidene ascorbic acid | — | — | — | — | — | — | — | — | — | — |
| Carbohydrate (%-wt.) [a] | | | | | | | | | | |
| Glucose syrup | 75 | 75 | 75 | 75 | 75 | 90 | 90 | 90 | 90 | 90 |
| Xylose | — | — | — | — | — | — | — | — | — | — |
| Fructose | — | — | — | — | — | — | — | — | — | — |
| Sucrose | — | — | — | — | — | — | — | — | — | — |
| Additive (%-wt.) [a] | | | | | | | | | | |
| Urea | 10 | — | 10 | 20 | — | 10 | — | 10 | 20 | — |
| Hypophosphorous acid | 2 | 2 | — | — | — | 2 | 2 | — | — | — |
| Sulfuric acid | — | — | — | — | — | — | — | — | — | — |
| Phosphoric acid | — | — | — | — | — | — | — | — | — | — |
| Boric acid | — | — | — | — | — | — | — | — | — | — |
| Amine (equiv.) [b] | | | | | | | | | | |
| Ammonia | 1.1 | 1.2 | 1.2 | 1.5 | 1.3 | 1.2 | 1.2 | 1.7 | 1.4 | 1.5 |
| Piperazine | — | — | — | — | — | — | — | — | — | — |
| Hexamethylenediamine | — | — | — | — | — | — | — | — | — | — |
| m-Xylylenediamine | — | — | — | — | — | — | — | — | — | — |
| Diethylenetriamine | — | — | — | — | — | — | — | — | — | — |
| Diethanolamine | — | — | — | — | — | — | — | — | — | — |
| Triethanolamine | — | — | — | — | — | — | — | — | — | — |
| Binder properties | | | | | | | | | | |
| Curing onset (° C.) | 156 | 144 | 177 | 183 | 171 | 166 | 172 | 194 | 195 | 202 |
| Curing endset (° C.) | 195 | 179 | 204 | 209 | 194 | 195 | 193 | 217 | 215 | 218 |
| Reaction loss (%) | 37.6 | 35.6 | 39.2 | 40.4 | 37.8 | 35.3 | 33.4 | 37.5 | 38.6 | 37.4 |
| pH of 15% soln. | 6.1 | 6.0 | 6.0 | 6.1 | 6.1 | 6.5 | 6.4 | 6.1 | 6.3 | 6.7 |
| Mechanical strength, unaged | * | *** | * | * | *** | ** | *** | * | * | *** |
| Mechanical strength, aged | * | ** | * | * | ** | * | *** | * | * | *** |

[a] Of ascorbic acid (or derivative) + carbohydrate.
[b] Molar equivalents relative to ascorbic acid (or derivative) + mineral acid.

The following observations and conclusions can be obtained from the experimental work documented in Table 1-1 to 1-5:

Combinations of L-Ascorbic Acid, Ascorbate Salts, Glucose Syrup and Ammonia to pH 6

The binder components L-ascorbic acid, ascorbate salts, ammonia and glucose syrup were mixed in various combinations and amounts.

Combinations of L-Ascorbic Acid, Glucose Syrup and Various Amines to pH

A broad and varied selection of amines was tested.

Observations: The curing temperatures can be modulated considerably by changing the amine component. Matching or even better mechanical strengths can be achieved by using hexadimethylenediamine, m-Xylylenediamine, diethanolamine or triethanolamine in place of ammonia.

Combinations of L-Ascorbic Acid, Glucose Syrup and Amines to pH 5-8.5

The influence of pH of the binder composition was investigated.

Combinations of L-Ascorbic Acid, Various Carbohydrates and Ammonia to pH 6

A varied selection of carbohydrates was investigated.

Observations:

The curing temperatures can be modulated considerably by changing the carbohydrate component. The mechanical properties are widely retained.

Combinations of Ascorbic Acid Variants and Derivatives, Glucose Syrup and Ammonia to pH 6

A selection of ascorbic acid variants were tested, such as salts, stereoisomers and oxidised ascorbic acid.

Observations:

The binder properties do not change considerably. The mechanical properties are widely retained.

Combinations of L-Ascorbic Acid, Glucose Syrup, Mineral Acids and Ammonia to pH 6

A selection of mineral acids was evaluated as additives.

Observations:

The inclusion of mineral acids decreases the curing onset and endset temperatures decreases the reaction loss, and the mechanical properties are widely retained.

The inclusion of hypophosphorous acid or sulfuric acid further improves the properties of the aqueous binder composition according to the present invention

The invention claimed is:

1. An aqueous binder composition for mineral fibers, wherein the composition comprises
   (a) a component (i) in the form of one or more compounds selected from one or both of
   compounds of formula

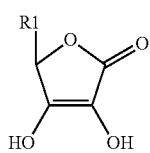

and salts thereof, in which R1 represents H, alkyl, monohydroxyalkyl, dihydroxyalkyl, polyhydroxyalkyl, alkylene, alkoxy, amine;

compounds of the formula

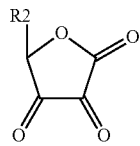

and salts thereof, in which R2 represents H, alkyl, monohydroxyalkyl, dihydroxyalkyl, polyhydroxyalkyl, alkylene, alkoxy, amine;
   (b) a component (ii) in the form of one or more compounds selected from ammonia, amines, and salts thereof;
   (c) a component (iii) in the form of one or more carbohydrates;
   and wherein >95 weight-% of a total solids content of the composition is formed by component (i), component (ii), component (iii), optionally present component (iv) selected from mineral acids and salts thereof, optionally present component (v) in the form of one or more reactive or non-reactive silicones and optionally present urea, based on binder composition solids content.

2. The composition of claim 1, wherein component (i) comprises one or more compounds selected from L-ascorbic acid, D-isoascorbic acid, 5,6-isopropylidene ascorbic acid, dehydroascorbic acid, salts of these compounds.

3. The composition of claim 1, wherein component (i) comprises one or more compounds selected from calcium, sodium, potassium, magnesium and iron salts of one or more of L-ascorbic acid, D-isoascorbic acid, 5,6-isopropylidene ascorbic acid, and dehydroascorbic acid.

4. The composition of claim 1, wherein component (ii) comprises one or more of ammonia, piperazine, hexadimethylenediamine, m-xylylenediamine, diethylenetriamine, triethylenetetramine, tetraethylenepentamine, monoethanolamine, diethanolamine, and triethanolamine.

5. The composition of claim 1, wherein component (iii) comprises one or more of dextrose, glucose syrup, xylose, fructose, sucrose.

6. The composition of claim 1, wherein component (i) comprises ascorbic acid, component (ii) comprises one or more of ammonia, diethanolamine, and triethanolamine, and component (iii) comprises one or both of dextrose and a glucose syrup having a dextrose equivalent (DE) of from 60 to 99.

7. The composition of claim 1, wherein the composition comprises from 1 to 50 weight-% of component (i), based on a mass of components (i) and (iii), from 50 to 99 weight-% of component (iii), based on the mass of components (i) and (iii), and from 0.1 to 10.0 molar equivalents of component (ii), relative to component (i).

8. The composition of claim 1, wherein the composition comprises from 0.05 to 10 weight-% of component (iv), based on a mass of components (i) and (iii).

9. The composition of claim 1, wherein component (iv) comprises one or more of an ammonium sulfate salt, an ammonium nitrate salt, and an ammonium carbonate salt.

10. The composition of claim 9, wherein component (iv) comprises an ammonium sulfate salt.

11. The composition of claim 1, wherein component (iv) comprises one or more of sulfuric acid, nitric acid, boric acid, hypophosphorous acid, and phosphoric acid.

12. The composition of claim 11, wherein component (iv) comprises one or both of sulfuric acid and hypophosphorous acid.

13. The composition of claim 1, wherein the composition further comprises a component (v) in the form of one or more reactive or non-reactive silicones.

14. The composition of claim 13, wherein component (v) comprises one or more silicones constituted of a main chain composed of organosiloxane residues bearing at least one hydroxyl, carboxyl or anhydride, amine, epoxy or vinyl functional group that is capable of reacting with at least one constituent of the binder composition.

15. The composition of claim 14, wherein the composition comprises from 0.1 to 15 weight-% of component (v), based on a solids content of the composition.

16. The composition of claim 14, wherein the organosiloxane residues comprise one or more of a diphenylsiloxane residue and an alkylsiloxane residue.

17. The composition of claim 1, wherein the composition further comprises urea.

18. A method of producing a bonded mineral fiber product, wherein the method comprises contacting mineral fibers with the binder composition of claim 1, and curing the binder composition.

19. A mineral fiber product, wherein the product comprises mineral fibers in contact with a cured product of the binder composition of claim 1.

20. The composition of claim 1, wherein the composition is formaldehyde-free.

* * * * *